Nov. 5, 1940.  E. FAGERHOLM  2,220,399

NOMOMECHANICAL CALCULATING APPARATUS

Filed Jan. 9, 1939  2 Sheets-Sheet 1

Inventor:
Erik Fagerholm,
By Cushman Darby & Cushman attys.

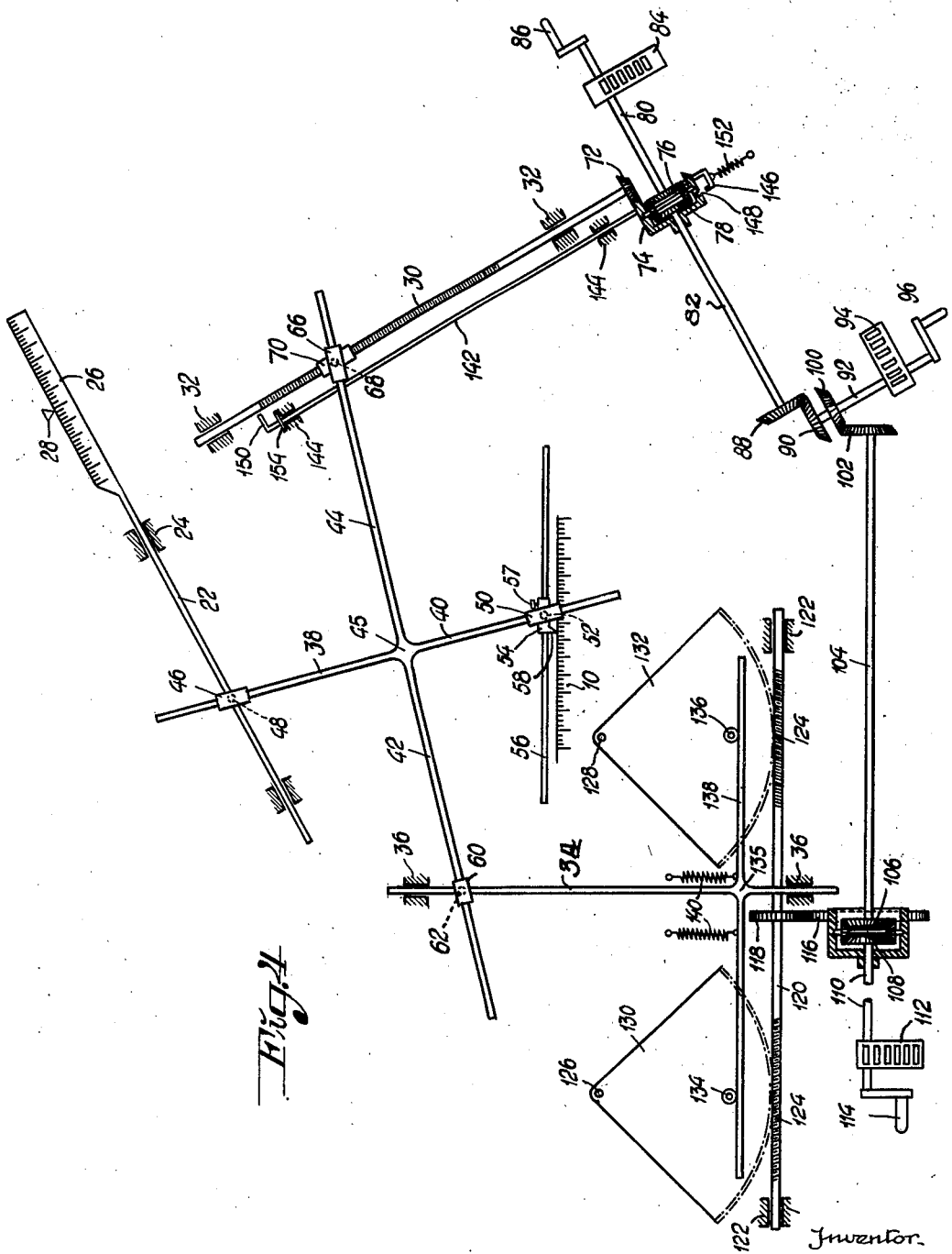

Patented Nov. 5, 1940

2,220,399

UNITED STATES PATENT OFFICE 2,220,399

NOMOMECHANICAL CALCULATING APPARATUS

Erik Fagerholm, Stockholm, Sweden, assignor to Henry Wild Surveying Instruments Supply Co., Ltd., Heerbrugg, Switzerland, a corporation of Switzerland Application January 9, 1939, Serial No. 250,053
In Sweden January 13, 1938

2 Claims. (Cl. 235—61.5)

The present invention relates to a nomomechanical apparatus for calculating the distance of a target out of the bearings thereof measured at the end points of a given base line of a length which is short in relation to said distance.

The principal object of the invention is to provide an apparatus of the type described which enables a rapid and correct determination of the distance.

Another object of the invention is to provide an apparatus of the type described in which setting members of the apparatus are connected with a rotatable spindle or spindles the rotation of which determines the adjustment of the setting members and in which said setting members are integral with each other so as to form an adjustable cross of rigidly inter-connected rigid arms, which co-operate with adjusting means to set the cross for the values influencing on the distance sought.

These and further objects of the invention will be best understood according as the following description proceeds reference being had to the accompanying drawings which form part of this specification.

On the drawings:

Fig. 4 is a diagrammatic plan view of a nomomechanical apparatus according to the invention.

Figure 1:
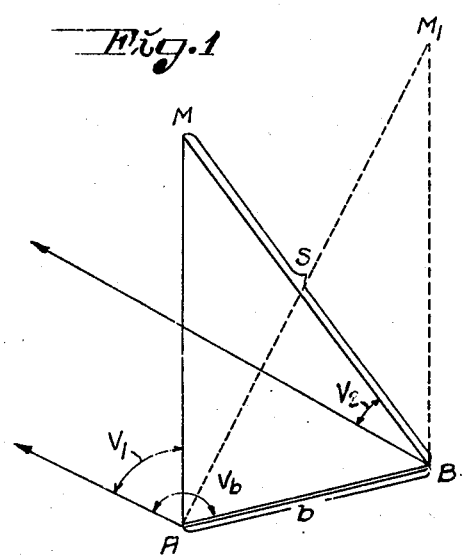
Fig. 1 is a diagram of the problem of calculation to be solved by the apparatus according to the invention.

With reference to Fig. 1, A and B are the end points of the base line and M the target. The length of the base line is $b$ and its bearing $v_b$, said quantities being considered to be known in advance. The bearings of the target measured from the end points A and B of the base line are designated by $v_1$ and $v_2$. The range MB designated by $s$ is obtained from the equation:

$$s = b \cdot \frac{\sin(v_b - v_1)}{\sin(v_1 - v_2)}$$

As the range $s$ is great in relation to the length of the base line $b$ we may write with sufficient correctness $\sin(v_1 - v_2) = \sin 1' \cdot (v_1 - v_2)$ where $v_1 - v_2$ is expressed in minutes, which gives us $$s = \frac{b}{\sin 1'} \cdot \frac{\sin(v_b - v_1)}{v_1 - v_2}$$

In order to calculate this equation by means of nomograms we give it the following form:

$$\frac{m \cdot s}{n \cdot b} = \frac{m \cdot \sin(v_b - v_1)}{n \cdot \sin 1' \cdot (v_1 - v_2)} \quad \quad (1)$$

where $m$ and $n$ are mere multipliers to be chosen with regard to the fields of variation of the various variables.

Figure 2:
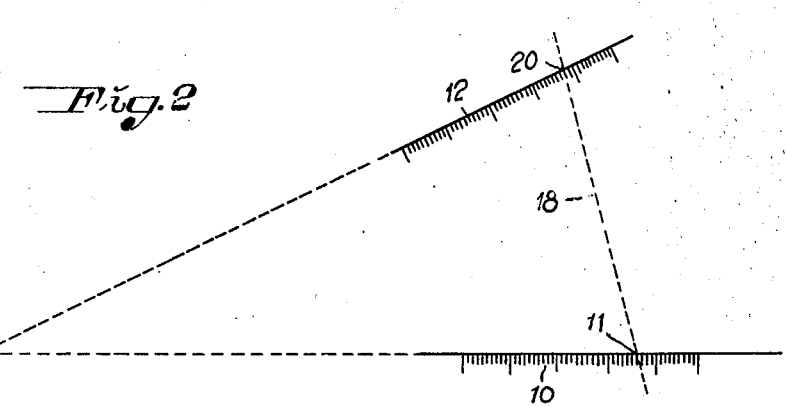
Figure 2A:
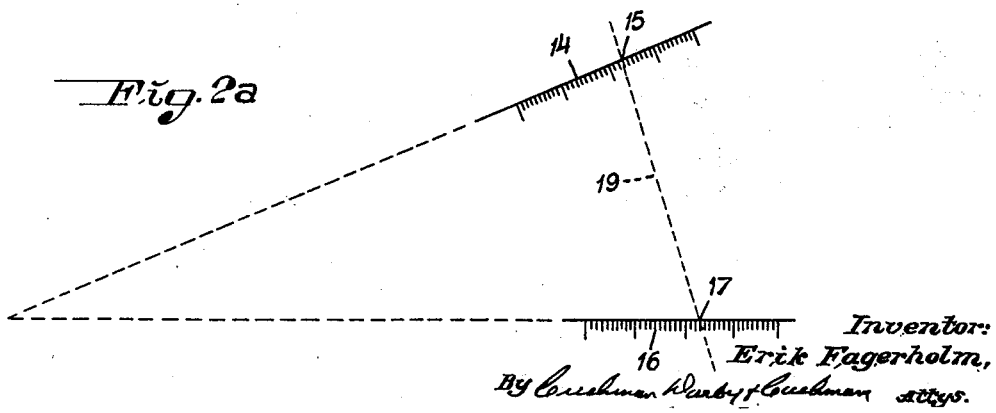

In Figs. 2 and 2a a nomogram is shown for the solution of the above Equation 1. 10 is the scale for the length $b$ of the base line, 12 that for the range $s$, 14 that for $v_1-v_2$ and 16 that for $\sin(v_b-v_1)$. The value of $b$ is set off on scale 10 at point 11, and the values of $v_1-v_2$ and $\sin(v_b-v_1)$ calculated from the measured angles $v_1$ and $v_2$ are set off on scales 14 and 16 at points 15 and 17, respectively. A straight line 18 drawn through point 11 parallel to the straight line 19 connecting points 17 and 15 crosses scale 12 in point 20 at which the range $s$ sought is read off. The portions of the scales shown by dotted lines correspond to fields of variation which need not be taken into consideration.

The nomomechanical apparatus according to the invention for the solution of the above problem is based on the diagrams illustrated in Figs. 2 and 2a with the difference that the one half of the nomogram shown in Fig. 2a is turned through a certain angle in relation to the other shown in Fig. 2, it being difficult by mechanical means on setting to secure true parallelism and free movements of rulers representing the lines 18 and 19 resulting in unreliable results. When electing an angle between the two halves of the nomogram of 90 degrees the two parallel lines 18, 19 will be replaced by a right angle arm cross $18^1$, $19^1$ as shown in Fig. 3.

Figure 3:
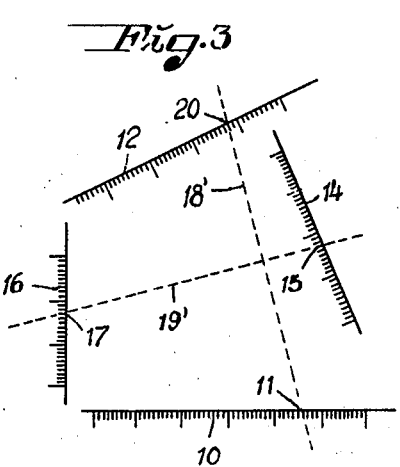
Figs. 2, 2a and 3 are nomograms for the solution of this problem.

With reference to Fig. 4 which shows diagrammatically a plan view of an embodiment of the nomomechanical apparatus according to the invention based on the diagram of Fig. 3, 10 designates as before the scale for the base line. The scale 12 for the range $s$ in Fig. 3 is constituted by a rod 22 displaceably mounted in bearings 24 and provided with a scale 26 readable conjointly with a relatively fixed index 28. A screw-threaded rod 30 mounted for rotation but not for displacement in bearings 32 corresponds to the scale 14 for $v_1-v_2$ in Fig. 3. One double arm 34 of a rigid right angle arm cross 135 displaceably mounted in bearings 36 corresponds to the scale 16 for $\sin(v_b-v_1)$ in Fig. 3. A rigid right angle arm cross 45 corresponds to the straight lines $18^1$, $19^1$ in Fig. 3. The angle between rods 22 and 30 and the angle between rod 34 and the guiding rod 56 for an index of the scale 10 are each equal to the angle through which the halves of the nomogram in Figs. 2 and 2a are turned in relation to each other, thus in the example chosen equal to 90 degrees.

One arm 38 of the arm cross 45 is displaceably guided in a sleeve 46 rotatably mounted on a pivot 48 on rod 22. The arm 40 of the cross 45 lying in the extension of arm 38 is displaceably guided in a sleeve 50 rotatably mounted on a pivot 52 fixed to a block 54 slidable along a fixed guiding rod 56. The scale 10 is readable conjointly with an index 58 fixed to rod 56. The sliding block 54 may be locked to rod 56 by means of a set screw 57. Of the two other arms of the cross 45 one arm 42 is displaceably guided in a sleeve 60 rotatably mounted on a pivot 62 on rod 34 and the other arm 44 similarly mounted in a sleeve 66 rotatably mounted on a pivot 68 fixed to a sliding nut 70 engaging the threaded rod 30.

Secured to rod 30 is a bevel gear 72 engaging a bevel toothing on the casing 74 of a differential gear the sun gears 76 and 78 of which are secured to spindles 80 and 82, respectively. Secured to spindle 80 at the outer end thereof is a handle 86. Secured to the outer end of spindle 82 is a bevel gear 88 engaging a bevel gear 90 having preferably the same diameter as gear 88 and secured to a shaft 92 which at its outer end carries a handle 96. The spindles 80, 82 are each connected with a counter 84 and 94, respectively, adapted to indicate the rotation of the spindles, for instance in angular measure.

Fixed to shaft 92 is a bevel gear 100 engaging a bevel gear 102 fixed to a spindle 104 carrying at its other end the one sun wheel 106 of a differential gear. The other sun wheel 108 of this gear is fixed to a spindle 110 carrying at its outer end a handle 114. Also spindle 110 is connected with a counter 112 to indicate its rotation. The casing of the differential gear is provided with a toothing 116 engaging a gear 118 on a spindle 120 rotatably mounted in bearings 122. At its end portions spindle 120 is threaded to form tangent screws 124 each engaging a toothed sector 130 and 132, respectively, rotatable on pivots 126 and 128, respectively. Rotatably mounted on each of said toothed sectors is an abutment roller 134 and 136, respectively, and bearing on said rollers under the action of springs 140 is the other double arm 138 of the arm cross 135 including the rod 34.

The operation of the apparatus is as follows:

On scale 10 index 58 is set to indicate the length $b$ of base line and sliding block 54 is locked in set position by set screw 57. Handles 96 and 86 are rotated, until counters 94 and 84 register the values of the angles $v_1$ and $v_2$, respectively. By means of the differential gear 74, 76, 78 rod 30 will thereby be rotated through an angle proportional to $v_1-v_2$ causing the nut 70 to be displaced through a corresponding distance bringing with it the arm cross 45. Handle 114 is rotated until counter 112 registers the value of the angle $v_b-90°$. The rotation of handle 96 to indicate the angle $v_1$ is also transferred to spindle 104 by the bevel gearing 100, 102. As spindle 110 is rotated through the angle $v_b-90°$, spindle 120 will be rotated through an angle proportional to $v_b-v_1-90°$. By means of the tangent screws 124 this rotation is transferred to the toothed sectors 130, 132. The ratio of transmission between the spindles 104, 110 and the toothed sectors is such that the angle of rotation of the sectors is equal to the variation of the angle $v_b-v_1$. Thereby the arm cross 135 will be displaced through a distance proportional to cos $(v_b-v_1-90°)$, that is sin $(v_b-v_1)$, carrying with it the arm cross 45. The adjustment of the arm cross 45 by the displacement of nut 70 and rod 34 brings the index 28 opposite the particular mark on the scale 26 which indicates the range $s$.

By suitably adapting the ratios of the gears, the graduations of the scales 10 and 26 and the distance of the rollers 134, 136 to the respective pivots 126 and 128 the multipliers $m$ and $n$ may be chosen so as to suit in the best manner the purpose for which the apparatus is intended.

The reading-off of the scale 26 may, of course, in known manner be facilitated by means of nonius, microscope or the like. The adjustment of the rod 22 may also be utilized for setting any other reading-off device, or its value may be directly introduced into a calculating apparatus, e. g. a central instrument for fire direction in coast artillery or anti-aircraft batteries.

In such cases where the greatest rapidity is required for the calculation of the range sought, especially when a great number of revolutions of the spindles 80, 82 and 110 is required for the introduction of the angles, the rotation of said spindles is preferably effected by means of electric motors, e. g. in such a manner that each spindle 80, 82 or 110 is actuated by two electric motors adapted to rotate the spindle in opposite directions via a differential gear.

Means may be provided to limit the movement of its movable parts, especially that of the setting members, so as to prevent a greater movement of said parts than that consistent with the mechanical performance of the apparatus. The field of movement of, for instance, nut 70 is limited by the length of the threaded portion of rod 30, and if the rotation of said rod is continued after the nut having attained one of its end positions, there is a risk of the apparatus being destroyed or, at least, set out of function. Similarly the rotation of the toothed sectors 130, 132 is limited to a given angle on both sides of the starting position shown in Fig. 4.

In the manually operated apparatus shown in the drawings said safety means may consist, for instance, of a device actuated by the setting member at the end positions thereof so as to lock the casing of the appurtenant differential gear. Thereby a continued rotation of the spindle which moves the member towards the end position referred to does not cause any further actuation of the member but only a rotation of the twin spindle. In the drawings such a safety device for rod 30 in the upper end position of the nut 70 is shown diagrammatically in Fig. 4. The device comprises a longitudinally displaceable rod 142 guided in suitable bearings 144 and having its lower end 146 formed to engage a recess 148 in the casing 74 of the differential gear and at its other end an abutment 150 adapted to be actuated by the nut 70 when said nut attains its upper end positions. A spring 152 holds the rod 142 in disengaged position with a stop 154 thereon bearing on the upper bearing 144. When attaining its upper end positions nut 70 strikes the abutment 150 moving the rod 142 upwardly against the action of the spring 152 and causing the lower end 146 of the rod to engage the recess 148 in casing 74 which thereby is locked. Further rotation of the spindle e. g. 80 which moves the nut upwardly results only in a rotation of the twin spindle 82 which may be read off on counter 94.

When the apparatus is operated electrically such a safety means may comprise an electric contact device adapted to be opened in the upper end position of the nut and inserted into the circuit of the electric motor the rotation of which causes the nut to be moved towards this end position.

Evidently, such a safety device may be provided also at the lower end position of nut 70 as well as at the end positions of the toothed sections 130, 132.

Such safety devices are of importance in such cases when after the distance to a certain target M has been determined it is desired to determine the distance to another target $M^1$ Fig. 1 for which the angles $v_1$ and $v_2$ differ considerably from those for the target M. In such case the spindles 80 and 82 ought really to be rotated simultaneously and at approximately the same speed unless nut 70 be moved beyond its allowed field of movement. However, this is difficult to perform in practice, irrespective of the spindles being manipulated by different persons or by one and the same person either manually or electrically. By providing safety devices of the above or any other kind at the end positions of nut 70 it is possible first by means of handle 96 or the electric motor driving spindle 82 to effect a rough adjustment of the nut 70 whereby spindle 80 is automatically brought along when the nut attains one of its end positions. Only after this rough adjustment the handle 86 or the electric motor driving spindle 80 need to be used.

The invention is not restricted to the embodiment shown in the drawings which may be modified in several respects without departing from the principle of the invention.

What I claim is:

1. A nomomechanical apparatus for calculating the distance of a target out of the bearings thereof measured at the end points of a base line of a given length which is short in relation to said distance, comprising an adjustable cross of rigidly inter-connected rigid arms, means associated with one arm of the cross to adjust the cross for the value of the length of the base line, means associated with a second arm of the cross to adjust the cross for the value of the sine of the difference of the bearing of the base line and the bearing of the target at one end point thereof, means associated with a third arm of the cross to adjust the cross for the value of the difference of the bearings of the target at the end points of the base line, and means associated with the cross to indicate the total setting of the cross by said adjusting means and thereby the distance sought.

2. A nomomechanical apparatus for calculating the distance of a target out of the bearings thereof measured at the end points of a base line of a given length which is short in relation to said distance, comprising an adjustable cross of four rigidly inter-connected rigid arms forming right angles with each other, means associated with a first arm of the cross to adjust the cross for the value of the length of the base line, means associated with a second arm of the cross to adjust the cross for the value of the sine of the difference of the bearing of the base line and the bearing of the target at one of the end points thereof, means associated with a third arm of the cross to adjust the cross for the value of the difference of the bearings of the target at the end points of the base line, and means associated with the fourth arm of the cross to indicate the total setting of the cross by said adjusting means and thereby the distance sought.

ERIK FAGERHOLM.